UNITED STATES PATENT OFFICE.

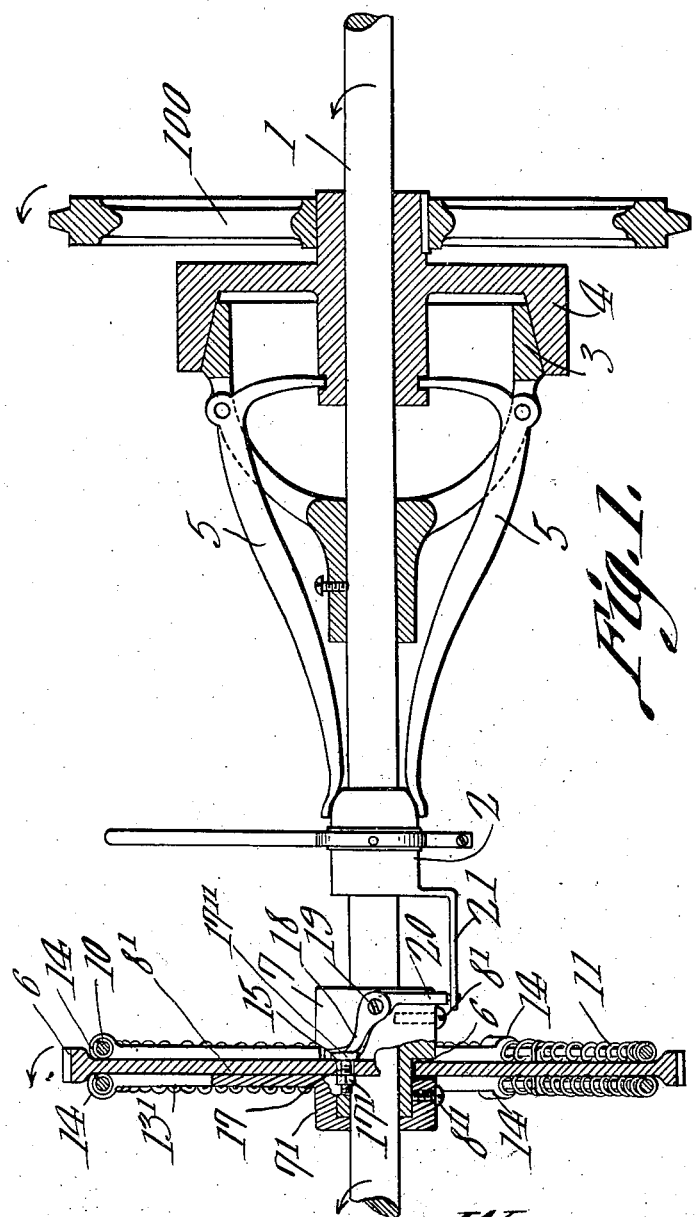

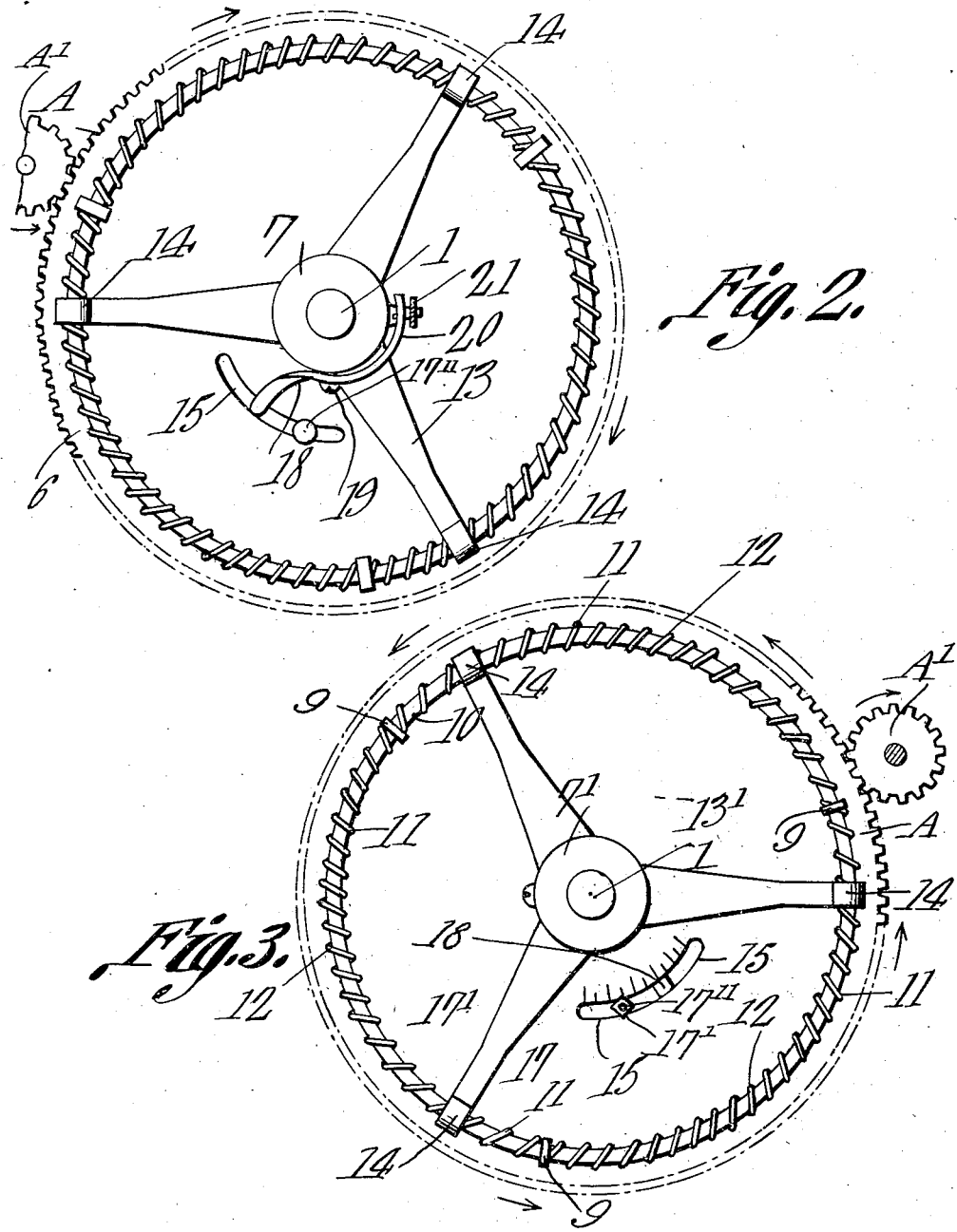

WARREN B. KEATOR, OF FINDLAY, OHIO.

AUTOMATIC CLUTCH-RELEASE.

1,017,219.

Specification of Letters Patent.  Patented Feb. 13, 1912.

Application filed June 21, 1911. Serial No. 634,398.

*To all whom it may concern:*

Be it known that I, WARREN B. KEATOR, a citizen of the United States, residing at Findlay, in the county of Hancock and State of Ohio, have invented a new and useful Automatic Clutch-Release, of which the following is a specification.

This invention relates to an improvement in automatic clutch releases, and the primary object of the invention is the provision of a clutch release adapted for releasing a clutch when too great or sudden a strain or load is thrown upon the driven element releasing the driven element from the driving element without damaging the machinery.

A further object of the invention is the provision of an automatic clutch release, provided with means for taking care of the recoil and means for cushionedly retarding the motion caused by the sudden stoppage of the driven element, whereby the said driven element is automatically released from operative connection with the driving element.

A further object of this invention is the provision of an automatic clutch release which will enable the operator to set the same at a given or predetermined power application, whereby when the power application between the driving shaft and driven shaft has reached the limit, the said release will be automatically operated to disconnect the driven from the driving element, thereby preventing breakage of the driving element.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a longitudinal sectional view through a clutch and the automatic release, the same being shown in operable relation upon the shaft. Fig. 2 is an elevation showing one side of the release. Fig. 3 is a similar view taken from the opposite side thereof.

Referring to the drawings, the numeral 1 designates the driving shaft, which has mounted slidably thereon, and rotatable therewith, the clutch release 2, and the two clutch members 3 and 4 which are adapted to be operated to effect the driven element 100 through the medium of the clutch engaging and releasing arms 5, which are operably connected with the clutch release 2.

Rotatably mounted upon the shaft 1 between two hubs 7 and 7' is a geared disk 6, having teeth A, meshing with the driving gear A', the said hubs 7 and 7' being held in relative position to themselves and the disk 6 by means of the screw 8', thus causing the said hubs 7 to rotate with the shaft 1 at all times. Upon each face of the flat portions 8 of the rotatable member 6, is mounted the stationary lugs or guides 9 in which are secured the two circular rings 10, said rings being cylindrical in cross section, and concentric with the periphery of the disk 6. Mounted upon the rings 10 between the said lugs 9 are the main tension spring 11 and the short recoil spring 12, while carried by the hubs 7 and 7', respectively, are the spiders 13 and 13' respectively, their outer ends being provided with the cylindrical sleeves 14, which fit upon the rings 10 and have the said springs 11 and 12 abut opposite sides thereof, so as to retain the said spiders in the positions substantially as illustrated in Figs. 2 and 3. These sleeves 14 are slidably mounted upon the rings 10 whereby any undue pressure thrown upon the shaft 1 will cause the said spiders to move upon the rings 10 and thereby depress the coiled springs 11, this action releasing the clutch as will be hereinafter set forth.

Provided in the disk 8 through the body thereof is a curved slot 15 which is provided with graduations 16 to indicate the number of pounds pressure required to actuate the automatic release. Adjustably mounted in this slot is a stud or bolt 17 held relatively thereto by means of a nut 17' and the head 17", said stud 17 being set at the desired limit and to have its head 17"' engaged by the outer end of the curved trip lever 18 which is pivoted at 19 to the hub 7, the other free end 20 of said trip lever being pivoted to the inner end of the arm 21, which is made fast to the clutch release 2. By this means it will be seen that any undue pressure thrown upon the driven element 100 will cause the spiders 13 and 13' to be moved in the direction of the spring 11 thereby moving the trip lever 18 within the graduated slot 15 to abut the rigidly held head 17" of the stop or stud 17, causing the actuation of the free end 20 of said lever to release the clutch 2 and operate the clutch members 3 and 4 so that the driven element A will be permitted to be free from the driving element 1, thereby permitting the driving element to rotate freely without being affected by the jar of the stoppage of the driven element A.

By means of the recoil springs 12 when the clutch members 3 and 4 are thrown into operation after the driving element A has been released of the obstruction, any recoil or sudden jar occasioned by the starting of the clutch will be taken care of by means of the same. The tension of the springs 11 and 12 are so arranged as to hold the spiders 13 and 13' normally in the position as shown in Figs. 2 and 3, the neutral position of said spiders being of course near the lugs 9 upon the side of the coil spring 12.

From the foregoing taken in connection with the drawings, it is evident that a spring cushioned clutch releasing device is provided that will automatically release a clutch when any obstruction is thrown upon the element 100, and by means of said release the driving shaft 1 is permitted to rotate freely upon the driven element A and thereby prevent any injury to the driving element. By means of the graduated slot 15 the pressure desired to actuate the automatic clutch may be regulated, so that should the pressure necessary to operate the element 100 be approximately 300 pounds, the said trip lever may be set to actuate the automatic release at 325 pounds, thus providing an automatic release and governor mechanism for operating the clutch members 3 and 4. It will also be noted that this construction of release device may be applied to any shafting, where clutches are employed, and that any form of clutch may be used in connection with the release, it simply being necessary to connect the clutch with the trip lever 18 at its arm 20 to produce an operable mechanism.

What is claimed is:

1. The combination with a driving shaft, and a clutch mounted thereon, of a clutch release, comprising a rotatably mounted wheel, a ring secured to one side thereof, a spider made fast to the shaft, a plurality of terminals carried by the spider, said terminals being slidably mounted upon said ring, means to cushionedly secure the spider to the wheel to cause the wheel to rotate with the shaft, and means operably connected to the spider, wheel, and clutch for operating the clutch.

2. The combination with a driving shaft, and a clutch mounted thereon, of a clutch release, comprising a rotatably mounted wheel, a ring secured to one side thereof and concentric with the periphery thereof, a spider made fast to the shaft and adjacent the wheel, a plurality of terminals carried by said spider and slidably mounted upon said ring, means mounted upon the ring to cushionedly secure the terminals and the spider to the wheel and cause the shaft to rotate with the wheel, and means operably connected to the spider, wheel and clutch for operating the clutch.

3. The combination with a driving shaft, a clutch mounted thereon, of a clutch release, comprising a rotatably mounted wheel, a ring secured to both sides thereof and concentric therewith, a spider made fast to the shaft, one upon each side of said wheel, a series of terminals to each spider slidably mounted upon said rings, a tension spring and a recoil spring mounted upon said ring between the terminals of the spiders, and means operably connecting the spiders to the wheel and clutch for operating the clutch.

4. The combination with a driving shaft, and a clutch mounted thereon, of a clutch release, comprising a rotatably mounted wheel, a ring secured to each side thereof concentrically of the wheel, a spider made fast to the shaft upon each side of said wheel, a series of terminals to each spider slidably connected to said rings, a recoil spring and a tension spring mounted upon the rings for each terminal of the spider, and a tripping device operably connected with the spiders, wheel and clutch mechanism.

5. The combination with a driving shaft, and a clutch mounted thereon, of a clutch release, comprising a rotatably mounted wheel provided with a slot within its periphery, two rings mounted upon and carried by said wheel one upon each side thereof and concentric with the periphery thereof, two spiders made fast to the shaft, a plurality of terminals to each spider slidably secured to the rings of the wheels upon both sides of said wheel, a tension spring and a recoil spring mounted upon the rings, one pair to each terminal of the spider, a trip lever pivotally connected to one of said spiders and having its free ends operably connected with the slot in the wheel and with the clutch mechanism.

6. The combination with a driving shaft and a clutch mounted thereon, of a clutch release, comprising a rotatably mounted wheel, a ring secured to each side thereof concentric with the periphery thereof, a spider made fast to the shaft and upon each side of said wheel, said spiders having a series of arms the terminals of which are slidably connected to the respective rings of the wheels, a recoil spring and a tension spring mounted upon the rings one pair to each terminal of the spider, and a trip lever pivotally connected to the spider and having one end operably connected with the wheel and the other operably connected with the clutch.

7. The combination with a driving shaft, and a clutch mounted thereon, of a clutch release comprising a rotatably mounted wheel, a ring secured at equi-distant points upon each side of the said wheel and rotatable therewith, two spiders made fast to the shaft and having terminals slidably connected to said rings between the points of connection of the ring to the wheel, two springs mounted upon the rings between said points of connection thereof, to the wheel, one spring upon each side of a terminal of the spider, and a clutch releasing lever operably connected to the wheel, one of the spiders, and clutch mechanism.

8. The combination with a driving shaft, and a clutch mechanism mounted thereon, of a clutch release, comprising a rotatably mounted wheel provided with a curved or segmental slot through the body thereof, a ring made fast at equi-distant points upon each face of said wheel and concentric with the periphery thereof, two spiders made fast to the shaft and having their terminals slidably connected to the respective rings of the wheel between the points of connection of the rings to said wheel, spiral springs mounted upon the sections of the rings between the points of connection with the wheel and retaining the terminals of the spiders therebetween, and a trip lever having one end operably connected to the slot of the wheel pivotally connected to one of the spiders and having the other end connected to the clutch.

9. The combination with a driving shaft, and a clutch mechanism mounted thereon, a clutch release comprising a rotatably mounted wheel provided with a slot intermediate of its periphery and center, two rings concentrically mounted one upon each side of said wheel and having its points of connection equi-distant apart, two springs mounted upon said rings between said points of connection, two spiders made fast to the shaft and having their terminals slidably connected to the rings between the opposed ends of the springs thereof and a trip lever operably connected to one of said spiders and to the slot of the wheel and the clutch mechanism.

10. The combination with a driving shaft, and a clutch mechanism mounted thereon, of a clutch release, comprising a rotatably mounted wheel provided with a slot intermediate of its periphery and center, a ring secured to one side thereof at points equi-distant apart, two springs mounted upon said rings between each pair of the said points of connection with the wheel, a spider made fast to the shaft and having its terminals slidably connected to the rings between the opposed ends of each pair of springs, and a trip lever operably connected to the spider and to the wheel and to the clutch for operating the clutch.

11. The combination with a driving shaft, and a clutch mounted thereon, of a clutch release comprising a wheel, a hub carried by and fast to said driving shaft to be operably connected with said wheel of the release, cushioning means for retarding the movement of said wheel carried by the shaft with relation to the wheel, means connecting said wheel, and the hub made fast to the shaft and the clutch mechanism for operating the clutch through the medium of the wheel and said hub.

12. The combination with a driving shaft, and a clutch mechanism, of a clutch release comprising a wheel mounted thereon and free to rotate with relation to the shaft, two hubs mounted upon the said shaft, one upon each side of said wheel, a ring made fast at equi-distant points upon the two faces of said wheel near the periphery thereof, a series of arms carried by each hub and having their outer ends slidably connected to the rings of the wheel, said connection being between the connections of the ring to the wheel, means for cushioning the movement of the said arms upon the rings, and a trip device operably connected to the wheel, hub and clutch mechanism.

13. The combination with a driving shaft, a member rotatably mounted thereon, and a clutch for operably connecting the shaft and member together, of a clutch release operably connected to the member and to the clutch, actuated by the undue movement of the member in pulling direction, and means for regulating the pressure required to actuate the said release.

In testimony that I claim the foregoing as my own, I have hereto affixed my signature in the presence of two witnesses.

WARREN B. KEATOR.

Witnesses:
H. W. GLENHART,
W. E. SNYDER.